S. FAIRCHILD.
Carriage-Spring.
No. 4,414.
2 Sheets—Sheet 2.
Patented Mar. 14, 1846.
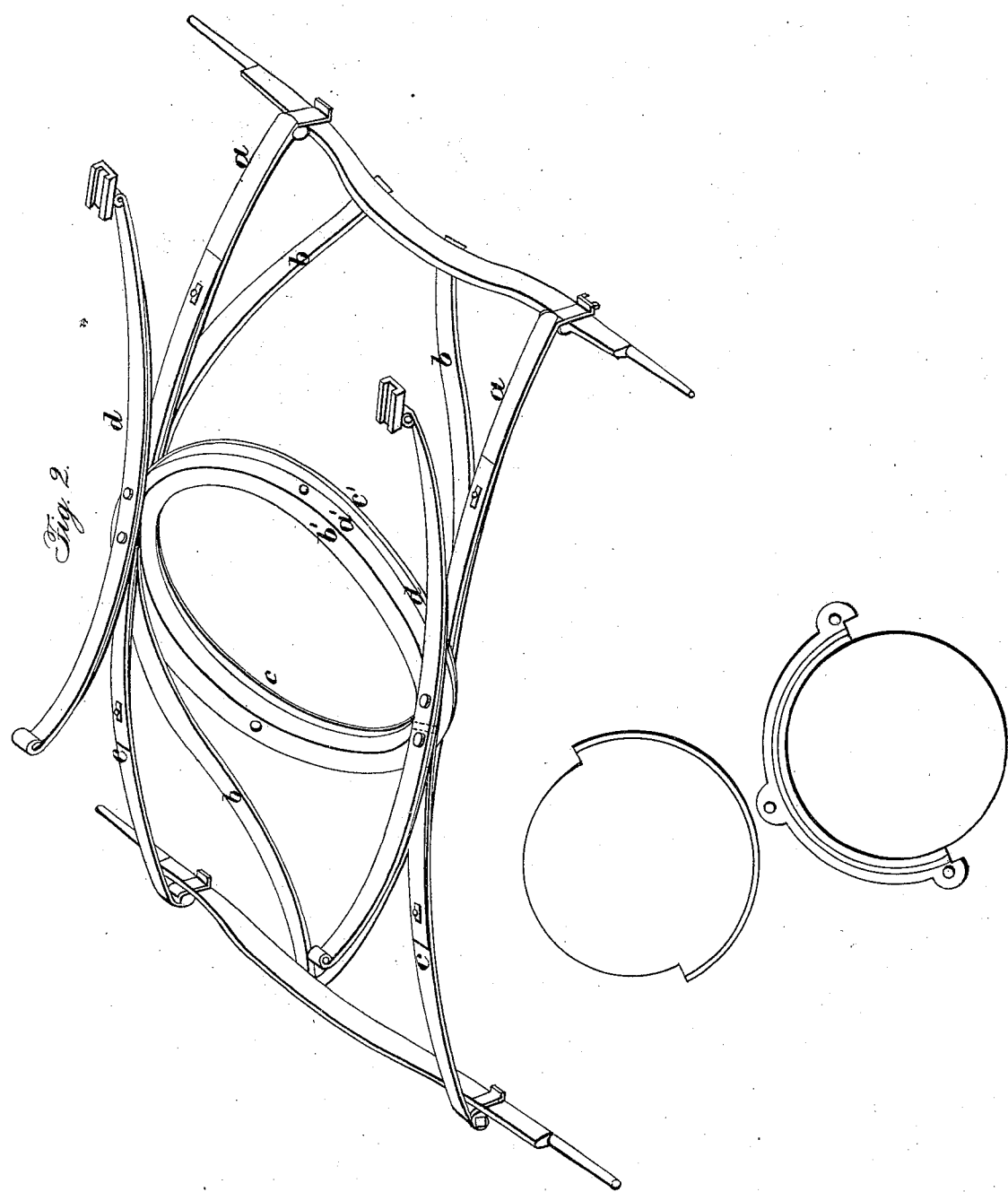

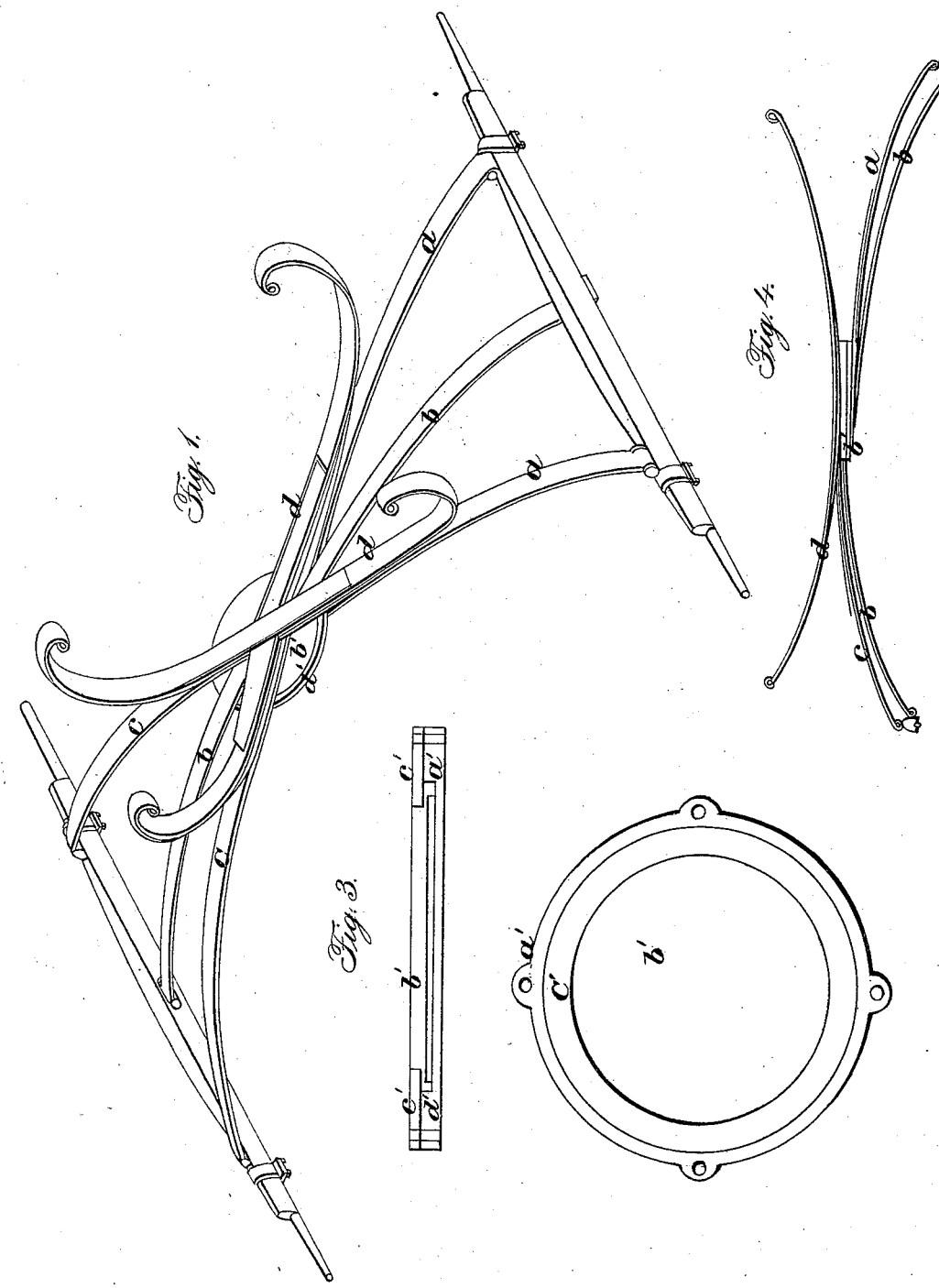
S. FAIRCHILD.
Carriage-Spring.
No. 4,414.
2 Sheets—Sheet 1.
Patented Mar. 14, 1846.

UNITED STATES PATENT OFFICE.

STARR FAIRCHILD, OF TRUMBULL, CONNECTICUT.

IMPROVEMENT IN HANGING CARRIAGES.

Specification forming part of Letters Patent No. 4,414, dated March 14, 1846.

*To all whom it may concern:*

Be it known that I, STARR FAIRCHILD, of Trumbull, in the county of Fairfield and State of Connecticut, have invented new and useful Improvements in the Mode of Attaching Springs and the Fifth-Wheel to the Running-Gear of Carriages and other Vehicles; and I do hereby declare that the following is a full, clear, and exact description thereof, reference being had to the accompanying drawings, which form a part of the same, in which—

Figure 1 is an isometrical view. Fig. 2 is a modification. Fig. 3 is the fifth-wheel shown in detached parts. Fig. 4 is a section view.

The nature of my improvements consists in the mode of application of semi-elliptic springs to carriages, placed in reverse order, extending from one axle to the other and supported upon the axle by the arrangement and combination of stays, and in the construction and application of the fifth-wheel to said constructions so as to dispense with the king-bolt.

The construction is as follows: Two half semi-elliptic springs $a\ a$ and a stay $b$ extend from the hind axle of a carriage to the center between the front and hind axles, as shown in Fig. 1, where they are connected with the lower section $a'$ of a fifth-wheel, (hereinafter more fully described,) and a similar pair of springs $c\ c$ and a stay $b$ are joined to the upper half $b'$ of the fifth-wheel and are connected to the forward axle; the stays being placed on the opposite side from the springs on the axle and in connection with the fifth-wheel or springs aid to keep the axles upright and the springs in place, as desired. On the top of the fifth-wheel are placed springs $d$, similar in form to one-half of an elliptic spring and connected to the body by any of the ordinary modes admitting of a rolling or sliding motion to permit the springs freely to operate and expand. These springs cross each other directly over the center of the fifth-wheel $a'\ b$. It will be perceived that the half of the fifth-wheel that is connected with the front axle also bears the upper spring $d$, by means of which the body of the carriage always fronts the horses in turning.

A modification of this construction is represented in Fig. 2, where, instead of having the springs cross under the center, I purpose to apply the springs $a\ a$ and $c\ c$ to any point on the fifth-wheel from their crossing-place to the edge of a circle of any desirable size and suitably stayed with one or more stays $b$, similar to the other arrangements to suit the builder and purchaser.

The fifth-wheel or circle referred to is shown in detached parts in Fig. 3, and is composed of a flat disk $a'$, of circular form, having a recess in it, into which fits a smaller plate $b'$. A ring $c'$ is made to correspond with and is bolted to the projecting part of disk $a'$ and extends over the edge around disk $b'$, holding it in place and thereby dispensing with a king-bolt. The same bolts that connect it together may serve to attach it upon its place.

I also purpose a combination of friction-rollers in or upon the ring $c'$ and disk $a'$ and just far enough apart to allow disk $b'$ to pass around between them, and may be placed at proper distances apart on bolts or shaftings; or they may be laid in loose close order between disks $a'$ and $b'$ and between disks $b'$ and $c'$, having them roll upon the plates without any shafts or axles, thus diminishing friction, &c. As the construction of these is well known, they are not shown in the drawings. The effect of thus suspending the springs, stays, and circle, as above described, is not only to dispense with the perch and common elliptic springs and king-bolt, but it also dispenses with the bolster or block and fifth-wheel over the front axle, and gives an increased amount of spring to the carriage, lessening all sudden and unusual shocks arising from any impediments which the wheels may meet with and imparting ease and comfort to the rider.

The effect of constructing and applying the fifth-wheel, as above specified, is not only to dispense with the king-bolt, but admits of a smaller construction of circle, combining greater power by having the bearings equalized all around its edge, and releasing a greater part of the friction when the combination of rollers is used, and the fifth-wheel to turn in the center induces the wheels to track in the act of turning, and the wheels may be constructed each of any desirable height and the body of the carriage being made always to front and turn with the horses, thus enabling the driver to have perfect command over them in all positions.

What I claim as my invention, and desire to secure by Letters Patent, is—

The combination of the fifth-wheel and springs and stays suspended between the axles under the bodies of carriages, in the manner and for the purpose herein set forth.

STARR FAIRCHILD.

Witnesses:
 REUBEN FAIRCHILD,
 HEZEKIAH S. NICHOLS.